United States Patent [19]

Takahashi et al.

[11] Patent Number: 5,425,066
[45] Date of Patent: Jun. 13, 1995

[54] METHOD OF FINDING THE CENTER OF A BAND-SHAPED REGION

[75] Inventors: Haruo Takahashi; Kiyoshi Hasegawa, both of Tokyo, Japan

[73] Assignee: Seiko Instruments Inc., Tokyo, Japan

[21] Appl. No.: 210,387

[22] Filed: Mar. 18, 1994

[30] Foreign Application Priority Data

Mar. 19, 1993 [JP] Japan .................. 5-060524

[51] Int. Cl.⁶ .......................... G01N 23/223
[52] U.S. Cl. .......................... 378/50; 378/44
[58] Field of Search .................. 378/44, 45, 50

[56] References Cited

U.S. PATENT DOCUMENTS 5,299,252  3/1994  Takahashi .................. 378/44 X

FOREIGN PATENT DOCUMENTS

| 0292540 | 8/1991 | Germany | 378/44 |
| 272534 | 11/1990 | Japan | 378/44 |
| 5126768 | 5/1993 | Japan | 378/44 |

*Primary Examiner*—David P. Porta
*Attorney, Agent, or Firm*—Spensley Horn Jubas & Lubitz

[57] ABSTRACT

The center of a band-shaped region on a sample is searched by first coarsely scanning a region of the sample, calculating a tentative center of the sample coarsely from scanning result, collecting data with reference to the tentative center, calculating the center of gravity from the result, and making a correction for raising the precision of the center of gravity determination.

4 Claims, 4 Drawing Sheets

METHOD OF FINDING THE CENTER OF A BAND-SHAPED REGION

BACKGROUND OF THE INVENTION

The present invention relates to a fluorescent X-ray film thickness measuring system.

In a known system used for this purpose, as shown in FIG. 6, samples are placed on a sample table 66. The operator moves the sample table to register the cross wires of a sample monitor unit 65 with the measurement desired location of the sample thereby to locate the position of measurement. In case the samples to be measured are thin, an observing optical system of low magnification is usually used to cover a wide range, but positioning with the aid of the sample monitor unit is then difficult. Thus, there has been adopted a switching system which can switch to an optical system of high magnification. Alternatively, the scanning is carried out in steps sufficiently smaller than the width of the samples so that the film thickness is determined from the measured result of the center of the samples, which is decided from the scanning profile.

Even the positioning of the prior art using the sample monitor unit could achieve a practical sufficiency for relatively large samples. As the miniaturization of electronic parts proceeds in recent years, however, precise positioning based on images on the sample monitor unit has become difficult because of limits on the resolution of the images and on the precision in the adjustment between the position to be irradiated with X-rays and the position of the cross wires of the sample monitor unit. In case, moreover, automatic measurements are to be continuously effected by registering the measurement position in advance, the allowance for the movement of a sample, if any, when the sample stage is operated, is seriously restricted to enhance the necessity for the function to effect the precise positioning.

For samples whose centers are difficult to position by an optical system of low magnification, on the other hand, the method of switching to an optical system of high magnification has the drawback that the system becomes expensive, and the method of determining the center from the profile takes a long time to measure the film thickness of one point, so that such an arrangement is not practical.

SUMMARY OF THE INVENTION

It is, therefore, an object of the present invention to solve those problems of the prior art and to provide means for effecting an accurate positioning within a short time without resorting to any image.

In order to solve the aforementioned problems, there is provided a method of centering either equidistantly arranged band-shaped samples which can be detected by X-ray fluorescence or band-shaped regions which can be discriminated from their surrounding regions by X-ray fluorescence, which method comprises: a first step of scanning a range corresponding to a pitch, at which the samples or regions are arranged, at a coarse interval as wide as the samples or regions; a second step of finding a position in the range which is as close to the measurement starting point as possible and which has a high X-ray intensity; a third step of determining a rough positional relation between the position which has been found to have a high X-ray intensity and the band-shaped samples or regions, and measuring the neighborhood of the band-shaped samples or regions at an interval of about one half of the width thereof on the basis of the foregoing determination to determine the positions thereof and the center of gravity of the X-ray intensity data; a fourth step of calculating the center of gravity again excepting the data which are found to be independent of the determined center of gravity because they are apart from the target samples or regions; and a fifth step of measuring two points, which are estimated to be close to the edge of the samples or regions, on the basis of the result of the second calculation of the center of gravity, to calculate the center of gravity by adding the data.

DESCRIPTION OF THE PREFERRED EMBODIMENTS

Figure 1:
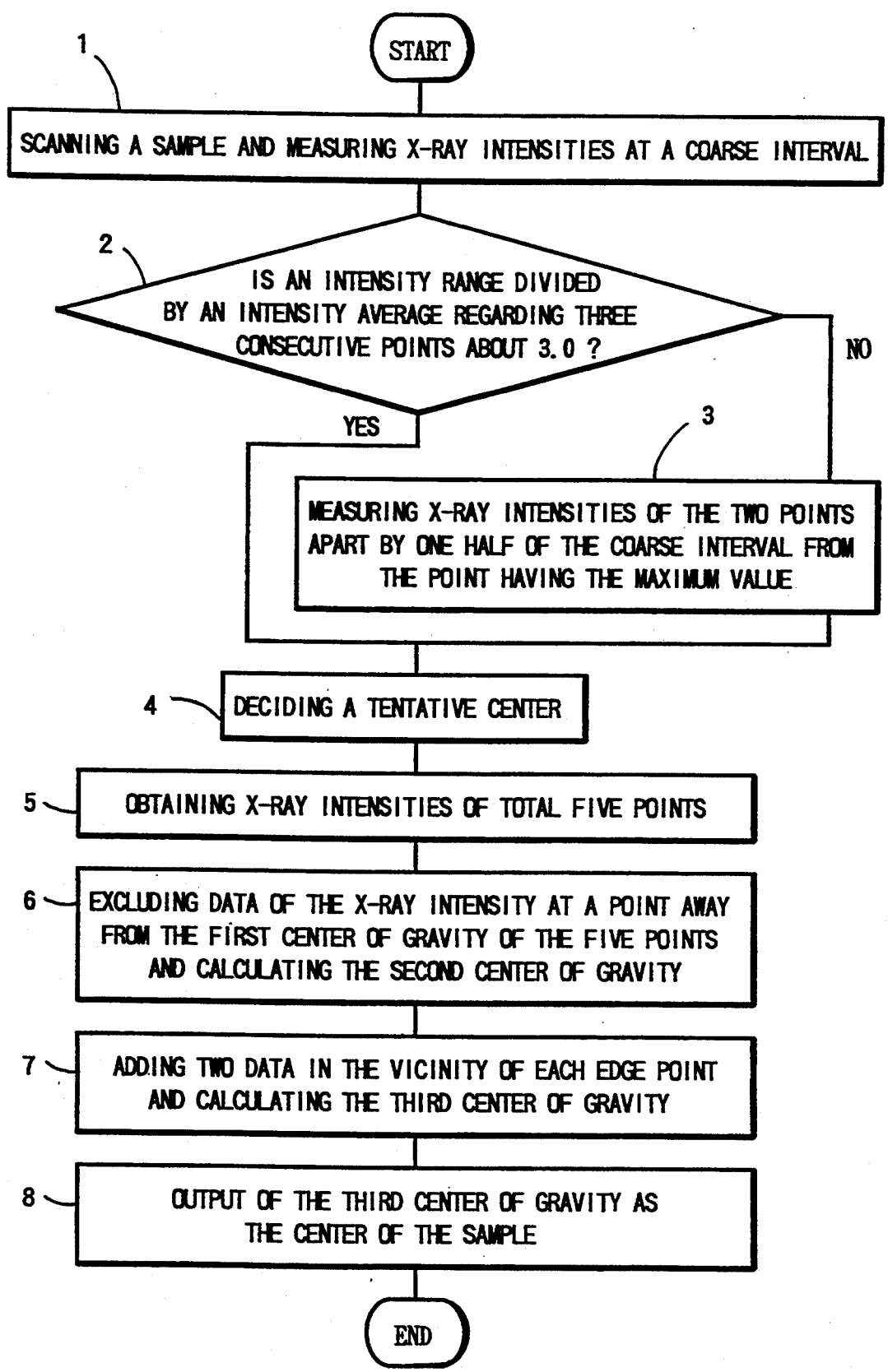
FIG. 1 is a flow chart showing a procedure for according to the invention for centering a band-shaped sample.

The method and principles of this invention will first be described with reference to FIG. 1.

At Step 1, a scanning is carried out at a coarse interval, i.e, in relatively large steps. At this time, at least one point to be measured has to include the neighborhood of a band-shaped sample or region, and at the same time the measurement has to be finished within a short time. To satisfy these requirements, the measurement range used is the difference between of the pitch of the band-shaped sample or region and the width of the X-ray beam, and the measurement interval used is one half of the difference. When, however, the width of the band-shaped sample or region is smaller than the pitch, use is made of the sum of the width and the width corresponding to the extension of the X-ray detectable region by the width of the X-ray beam. This measurement determines the point which has the maximum X-ray intensity. If this point is at the end of the scanning region, an outer point is further measured.

Then, the operation proceeds to Step 2 after the X-ray intensities of the point having the maximum X-ray intensity and the points at the two sides thereof have been obtained. In Step 2, the data of a total of three points, i.e. the point obtained in Step 1 to have the maximum X-ray intensity and the points at the two sides, are calculated by dividing the range of their values by an average value.

If the point indicating the maximum is near the center of the band-shaped sample or region, for example, the remaining two points have an X-ray intensity of about 0 so that the range/average takes a value near 3.0. If the range/average is found at about 3.0 by using that relation, it is decided that the maximum is associated with the vicinity of the center. Otherwise, it is decided that the maximum is located in the vicinity of the edge of the sample or region.

In case it is decided that the maximum is located in the vicinity of the edge, two points apart by one half of the initial scanning interval at the two sides of the maximum are measured in Step 3.

In case it has been decided in Step 2 that the point having the maximum X-ray intensity is located in the vicinity of the center of the band-shaped sample, the point is set to a tentative point at Step 4. Otherwise, that point of the two measured at Step 3 having the higher X-ray intensity is set to the tentative center in Step 4.

In Step 5, the X-ray intensities of a total of five points, i.e., the point of the tentative center and the two individual points located at each of the two sides and having one half of the initial scanning interval are determined. Instead of this processing, the data of the points which have been determined by the preceding measurements, are used.

In Step 6, the center of gravity is determined from the data of the X-ray intensity for the five points retained in Step 5, and the data decided to have no relation to the target sample or region are excluded depending upon the distances from the center of gravity.

In Step 7, the center of gravity is calculated again, and the two points to be estimated to be in the vicinity of the right-hand and the left-hand edges of the band-shaped sample or region are measured on the basis of the calculated center of gravity. The center to be determined is the result which is obtained by calculating the center of gravity again by adding the data for the edge points.

In Step 8, the last determined center of gravity is outputted.

In the following, the case of centering the leads of a lead frame will be described by way of example with reference to the drawing. In the case of the samples to be described first of all, the leads are placed at a right angle to the moving direction of the sample stage and have a width as large as one half of the pitch of the leads, i.e. the distance between the centers of the leads in the moving direction.

In a first embodiment, the X-ray intensities of three points are measured individually for one second each at intervals of one half of the pitch. If, at this time, the point having the maximum X-ray intensity of the three points is not a middle one, another point at the outer side is measured at the same interval.

Figure 3:
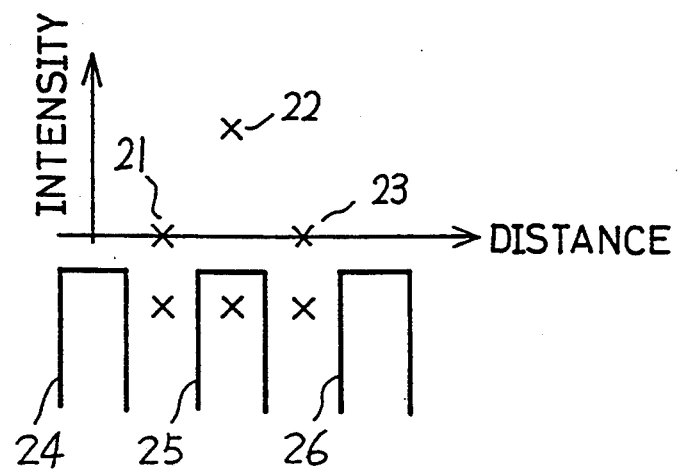
FIG. 3 is a schematic pictorial view showing relations between the measurement positions and the measured values in case the maximum is located in the vicinity of the center of the leads.

FIG. 3 shows the case in which three leads 24, 25 and 26 are disposed on a sample table and the point of maximum X-ray intensity 22 is located in the vicinity of the center of lead 25. In this case, the range of X-ray intensity values, the difference between the highest and lowest intensity values, at points 21, 22 and 23 divided by the average of the X-ray intensity values is about 3.0 so that the status can be decided, and point 22 in FIG. 3 is assumed to be a tentative center. And, the two points midway between points 21 and 22 and points 22 and 23 individually are measured.

Figure 4:
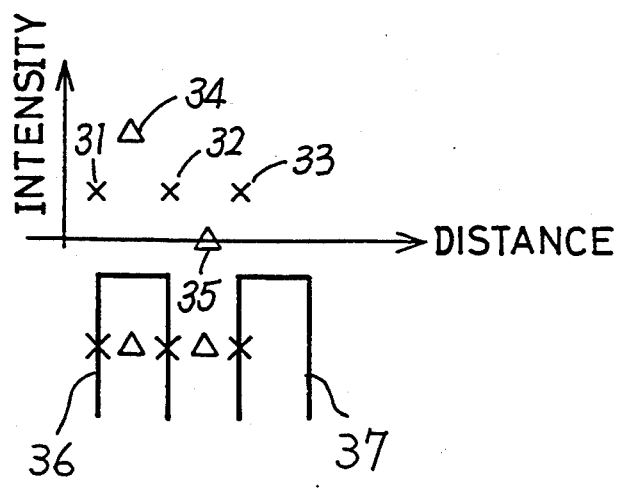
FIG. 4 is a diagram similar to that of FIG. 3 showing relations between the measurement positions and the measured values in case the maximum is located in the vicinity of the edge of the lead.

FIG. 4 shows the case in which points 31, 32 and 33 where intensity values are measured are located in the vicinity of the edges of leads 36 and 37. In this case, the range of the X-ray intensity values 31, 32, 33 is very small so that the range divided by the average of the X-ray intensities 31, 32, 33 take a value near 0. Leads 36 and 37 are accordingly assumed to be in the positions illustrated in FIG. 4. Points 34 and 35 of FIG. 4 are then measured to set the point having the higher X-ray intensity, i.e., the point 34 in this example, to the tentative center. And another point at the left-hand side of the point 31 is measured at an interval of one quarter of the pitch from point 31. In these ways, for lead 36 there are obtained the X-ray intensity data of a total five points, i.e., the tentative center 34 two points 32 and 35 at one side of point 34 and point 31 and a point not illustrated at the other side of point 34.

Figure 5:
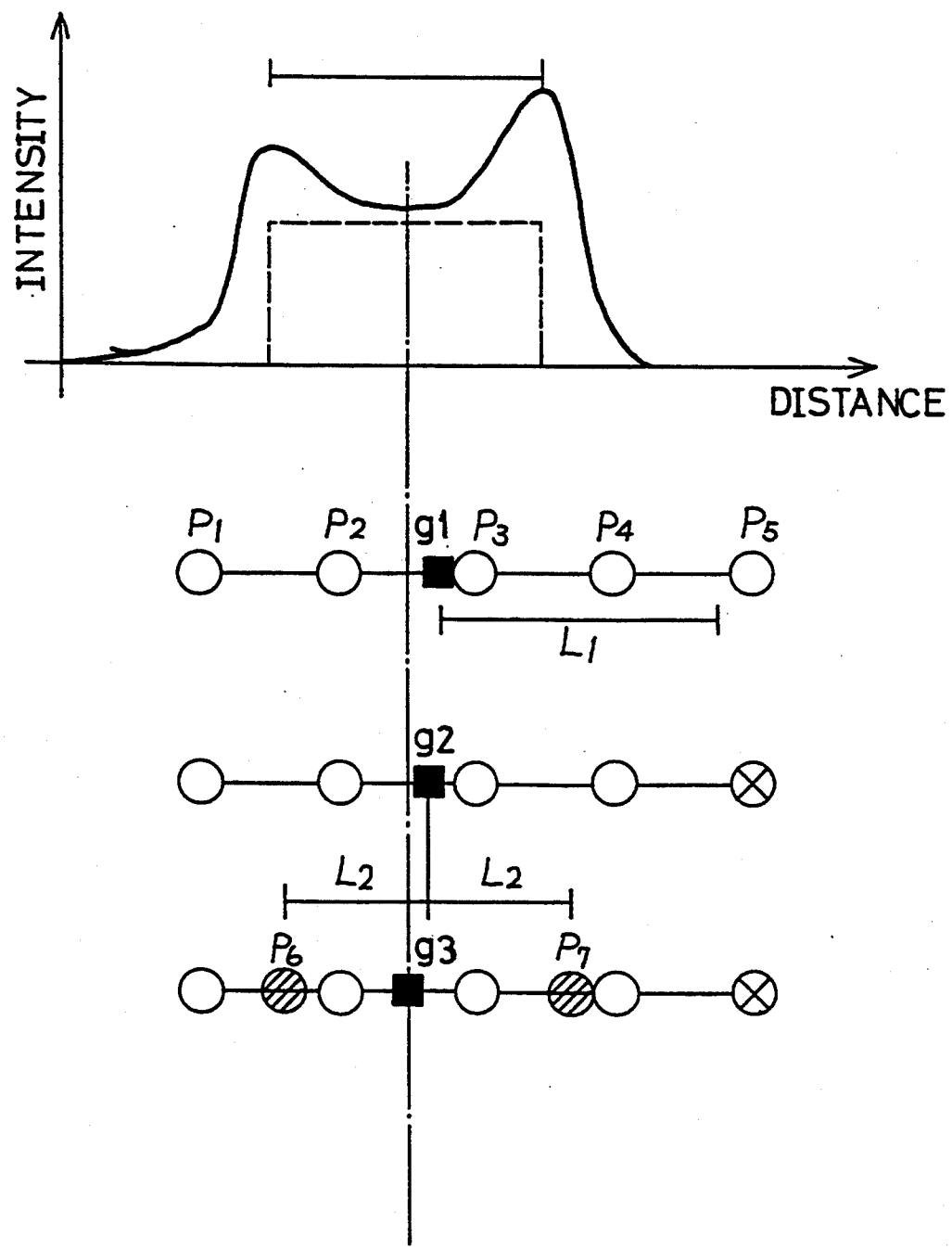
FIG. 5 is a diagram showing relations between the measurement points and the centers of gravity subjected to various corrections.
Figure 6:
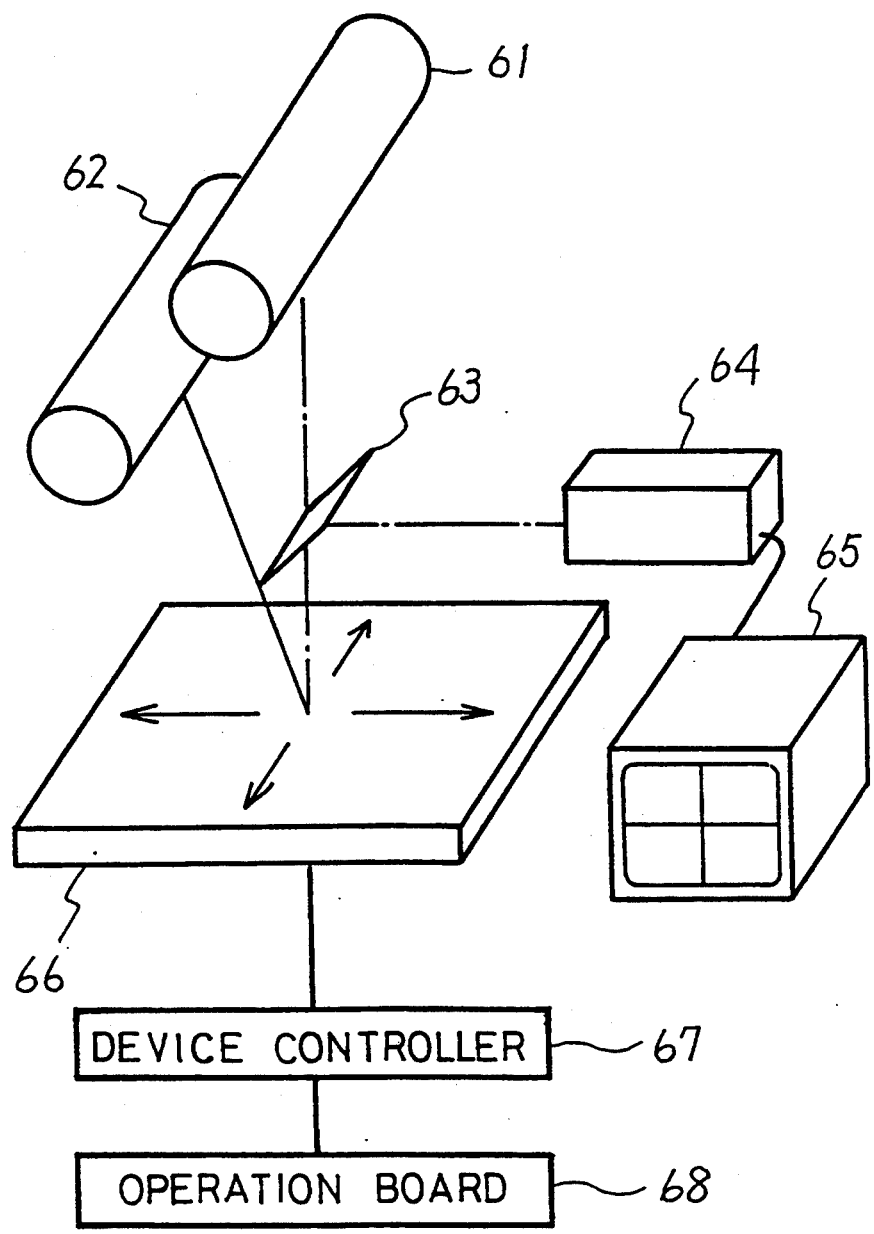
FIG. 6 is a schematic diagram showing the construction of a conventional system.

FIG. 5 schematically shows the manner of centering the leads by using those data. First of all, a center of gravity g1 is determined as to the points P1, P2, P3, P4 and P5. In this Figure, the point P5 is excluded from the calculation because its data are possibly related to the adjacent lead spaced at a distance L1 estimated to have a relation to the target lead. Then, calculations are carried out to determine a center of gravity g2. At points P6 and P7 spaced apart by a distance L2 from center of gravity g2, estimated to be the distance from the center to the edge of the lead, the X-ray intensity is measured. These data are added to calculate another center of gravity g3, the value of which is used as the center of the lead.

Figure 2:
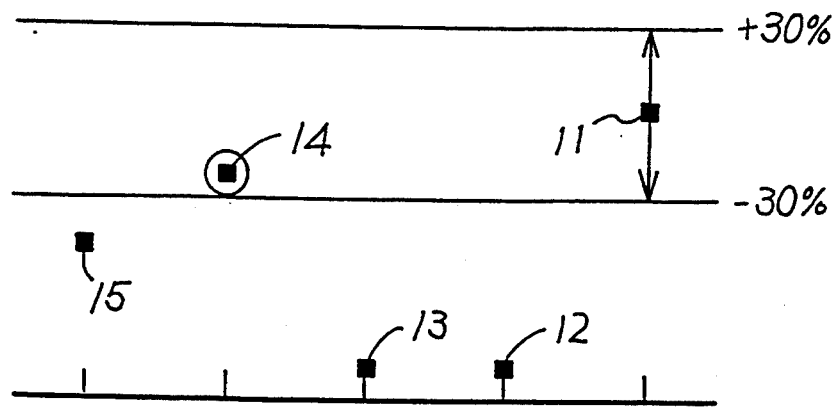
FIG. 2 is a schematic diagram for determining the maximum at a first stage measurement.

Next, there will be described the case in which the leads are placed at a right angle with respect to the moving direction of the sample stage and have a width as large as one quarter of the pitch. The result of the initial scanning of this case is schematically shown in FIG. 2. The point having the maximum X-ray intensity is simply located at 11, as shown. Since, however, the target lead may possibly be located closer to the measurement starting point 13, it is recognized as the maximum so long as it is within a certain range, e.g ±30%, as shown, with respect to the maximum. In short, the point 14 is set to the maximum, as shown in FIG. 2. After this, the center is determined as in the first embodiment.

According to a third embodiment, a single band-shaped sample is placed at a right angle with respect to the moving direction of the sample stage is to be centered. In this case, the pitch is designated to have a range sufficient for detecting the position of the sample. After this, the center is detected like the first or second embodiment in accordance with the ratio of the range to the sample width.

According to a fourth embodiment, a sample is arranged at an arbitrary angle with respect to the moving direction of the sample stage. In this case, the image on the sample monitor is thinned to recognize the sample as a straight line. If the gradient of the straight line is determined so that the scanning is carried out at a right angle with respect to the gradient, the center can be determined as in the first, second and third embodiments.

By combining this invention with the registration of a plurality of measurement points and measurement of those points automatically and successively, the film thickness at a desired point in a sample such as a lead frame or a TAB can be accurately measured to improve the measuring reliability dramatically. In addition, the number of points of measuring failures can be reduced to shorten the time period for their repeated measurements.

Moreover, the invention makes it possible to position even a sample which is so thin that positioning with the aid of a sample monitor is difficult. For measuring the film thickness of such a sample, the sample is scanned in the prior art in steps far smaller than the sample width, and the film thickness is adopted from that of the point which is decided to be located at the center from the scanned profile. In case the sample used has a width of 0.04 mm, with a pitch of 0.1 mm between samples, for example, the measurement takes a considerable time period, and the center is determined by a decision of the operator. According to the present invention, in contrast, the center can be determined in about eighteen seconds. In the present invention, moreover, no human decision is required in the course of measurement. As a result, there can be attained a remarkable effect that the operability is improved to effect the measurement promptly and precisely.

This application relates to subject matter disclosed in Japanese Application number 5-60524, filed on Mar. 19, 1993, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for locating the center of a bandshaped region of a sample, the region having a width, in an X-ray fluorescence film thickness measuring system which is composed of a sample table controlled for moving a sample having a band-shaped region at least horizontally or vertically, a sample monitor unit capable of confirming an X-ray irradiated position, an X-ray generating unit, an X-ray detecting unit, an operation unit for inputting and displaying information, and a system control unit for controlling the system, the band-shaped region being discriminated fluorescently from surrounding regions, said method comprising the steps of:

disposing a plurality of sample regions on the sample table so that a mutual spacing having a pitch exists between the sample regions;

scanning the sample over a range corresponding to the spacing pitch, at scanning points having a coarse interval corresponding to the sample region width;

identifying a point in the range which is close to the measurement starting point as possible and which has a high X-ray intensity;

determining a rough positional relation between the point which was identified in said identifying step and one band-shaped region;

measuring X-ray intensities in the neighborhood of the one band-shaped region at intervals of about one half of the sample region width on the basis of the determined rough positional relation to determine the positions thereof and the center of gravity of the data of the X-ray intensity;

calculating a new center of gravity by excluding delta which are decided to be independent of the center of gravity determined in said measuring step because they are apart from a target region; and measuring two further points, which are estimated to be close to the edge of the sample region, on the basis of the result of said step of calculating the new center of gravity, to calculate a final center of gravity by adding the data for the two further points.

2. A method for locating the center of a band-shaped region as set forth in claim 1, wherein the center of a single band-shaped region is located by designating a desirable search range as the pitch.

3. A method for locating the center of a band-shaped region as set forth in claim 2, wherein a band-shaped region having a length is placed on the sample table so that its length extends at an arbitrary angle with respect to a selected stage moving direction, further comprising: forming a refined image of the band-shaped region on the sample monitor unit by image processing; detecting the direction of the arbitrary angle; and performing said scanning step in a direction perpendicular to the detected direction.

4. A method for locating the center of a band-shaped region as set forth in claim 1, wherein a band-shaped region having a length is placed on the sample table so that its length extends at an arbitrary angle with respect to a selected stage moving direction, further comprising: forming a refined image of the band-shaped region on the sample monitor unit by image processing; detecting the direction of the arbitrary angle; and performing said scanning step in a direction perpendicular to the detected direction.

* * * * *